United States Patent Office 3,467,893
Patented Sept. 16, 1969

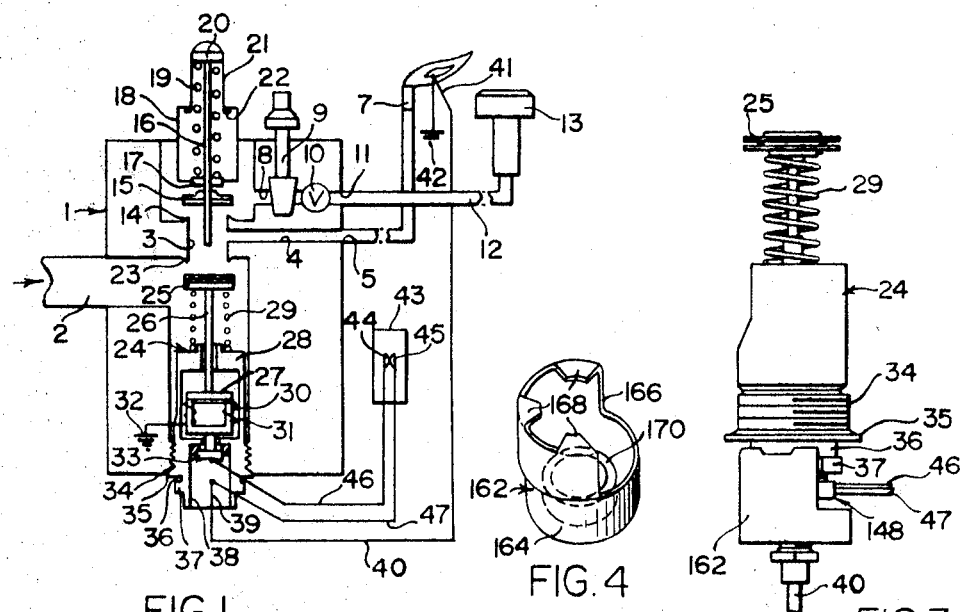
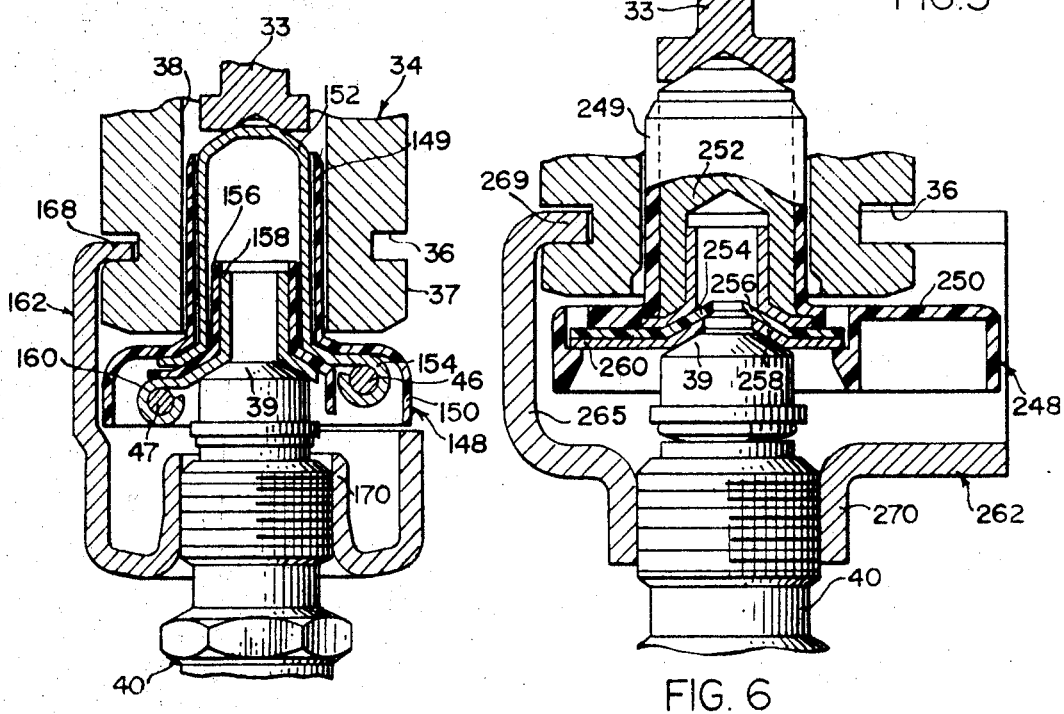
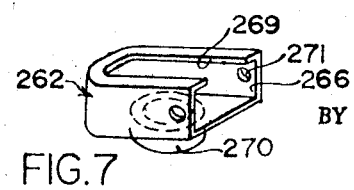
INVENTORS
WILBUR F. JACKSON &
HENRY C. BRAUCKSIEK
BY Anthony A. O'Brien
ATTORNEY INVENTORS
WILBUR F. JACKSON &
HENRY C. BRAUCKSIEK
BY Anthony A. O'Brien
ATTORNEY

3,467,893
MAGNET ASSEMBLIES AND TERMINALS
Wilbur F. Jackson, Rolling Hills, and Henry C. Braucksiek, Buena Park, Calif., assignors to Robertshaw Controls Company, Richmond, Va., a corporation of Delaware
Continuation-in-part of applications Ser. No. 287,061, June 11, 1963, and Ser. No. 502,990, Aug. 5, 1965. This application Oct. 18, 1966, Ser. No. 587,598
Int. Cl. H01h 47/22
U.S. Cl. 317—123    9 Claims

ABSTRACT OF THE DISCLOSURE

An electromagnetic assembly having electromagnetic means in a housing in a supporting base therefor; an electric terminal assembly is retained from a supporting base and is provided with specially constructed contacts to permit a control circuit to be series connected to the energizing circuit for the electromagnet.

---

Figure 8:
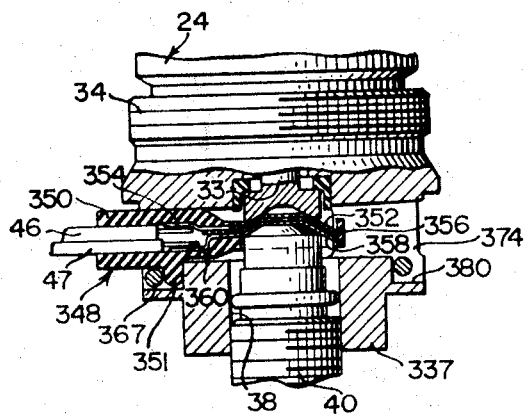

This application is a continuation-in-part of application Ser. No. 287,061, filed June 11, 1963, and application Ser. No. 502,990 filed Aug. 5, 1965. The present invention relates to magnet assemblies and terminals particularly applicable to a thermostatic control device for preventing dangerously high temperature conditions in a heating appliance such as a hot water heater.

As is disclosed and claimed in the above copending applications, a high limit switch is integrally assembled with the normal thermostatic control and is electrically connected ito the thermoelectric circuit for the holding magnet. For the sake of brevity, the disclosures of the above copending applications have been condensed into a schematic drawing, represented herein as FIGS. 1 and 2, respectively.

In modern heating appliances, such as domestic hot water heaters, it is standard practice to control a supply of fuel to a main burner and to a pilot burner, with the main burner flow being thermostatically controlled and the pilot burner flow being controlled by a thermoelectric safety device that shuts off flow to both burners. The thermoelectric safety device conventionally includes a valve member operatively associated with an armature that is biased to a valve closing position but is retained in a valve opening position when an electromagnet is energized by a thermocouple responding to the flame at the pilot burner; the voltage generated by the thermocouple is great enough to hold the armature in its valve open position but is not great enough to attract the armature, so reset means is utilized to move the biased armature against the electromagnet. As long as the electromagnet is energized, the main burner flow is thermostatically controlled as by a rod and tube type thermostat.

Explosions from dangerously high temperatures being developed in the hot water tank have presented a problem which has been approached by the prior art. For example, U.S. Patent No. 2,781,977 includes a lower cycling thermostat and a thermostatic switch that is attached to the upper exterior of the hot water tank and is connected in series with the thermoelectric circuit. While this arrangement presents some protection against abnormal temperature condition, it includes certain disadvantages such as cost of installation, being responsive only to the temperature at the top of the hot water tank, and difficulty in the electrical connection between the abnormal temperature switch, and the thermoelectric circuit for the safety holding magnet.

It is, therefore, an object of this invention to construct an economical, electrical terminal assembly for the thermoelectric circuit and safety magnet of a thermostatic control device having integrated normal and abnormal temperature control features.

Another object of this invention is to simplify the construction of an electric terminal assembly for the electromagnet of a thermostatic control device so as to be easily connected to a heating appliance without requiring the services of a skilled technician.

The present invention has another object in that the electromagnet assembly for a thermostatic control device includes a built-in junction terminal.

The present invention has another object in that a terminal connector for connecting a safety switch in series with an electromagnet assembly is readily connected to the magnet base thereof.

It is another object of the present invention to provide the magnet base of an electromagnet assembly with improved slot means for the reception of a terminal connector therein.

A further object of the present invention is to retain a terminal connector on the magnet base of an electromagnet assembly so that it will be in position for connection to thermocouple means associated with a heating appliance.

In practicing the present invention, an electromagnet assembly is constructed with a housing, electromagnetic means in the housing, a support base for the housing having a portion defining a cavity, conductor means connected to the electromagnetic means and extending through the base into such cavity for connection to energizing circuit means, an electric terminal assembly having a pair of spaced contacts adapted for respective connection to the conductor means and energizing circuit means, and retainer means cooperating with the base and terminal assembly for retaining the terminal assembly on the base.

Figure 9:
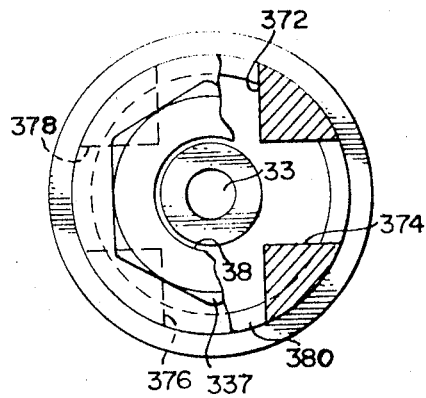
Figure 10:
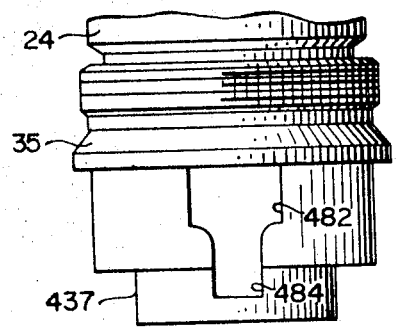
Figure 11:
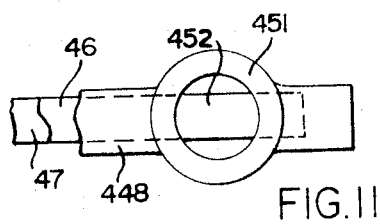
Figure 12:
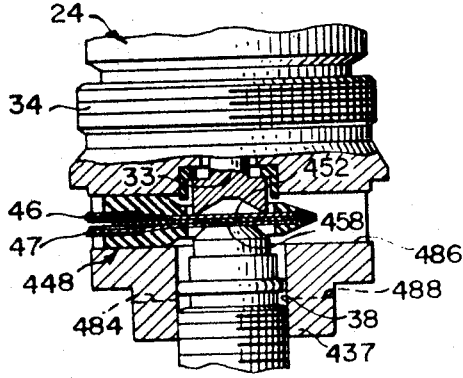
Figure 2:
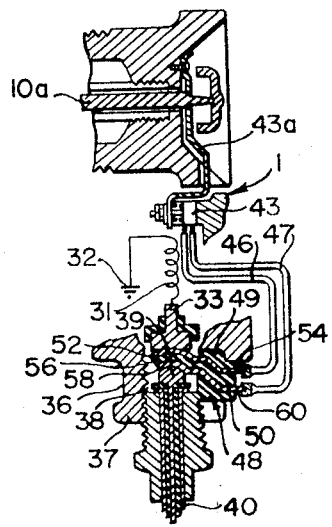

Other objects and advantages of the present invention will become apparent from the following description of a preferred embodiment, taken in connection with the accompanying drawing wherein:

FIG. 1 is a schematic diagram of a fuel burner control system embodying the present invention;
FIG. 2 is a partial cross-section of a detail of FIG. 1;
FIG. 3 is a side elevation view of an electromagnet assembly embodied in FIG. 1;
FIG. 4 is an enlarged perspective view of a detail of FIG. 3;
FIG. 5 is a partial cross section of a detail of FIG. 3 on an enlarged scale;
FIG. 6 is a partial cross section similar to FIG. 5 of a modification of the detail;
FIG. 7 is a perspective view of a detail of FIG. 6 on a reduced scale;
FIG. 8 is a partial cross section similar to FIG. 5 of another manifestation of the detail;
FIG. 9 is a bottom plan view of FIG. 8 with parts in section and parts removed;
FIG. 10 is a partial elevation view of another modification of the detail;
FIG. 11 is a top plan view of the electric terminal used with the magnet base of FIG. 10; and
FIG. 12 is a cross section of the detail of FIG. 10.

While the present invention may be applicable to various types of control devices and various types of heating appliances and may be utilized in connection with electrical heating elements as well as gaseous fuel burning heater elements, it will be described in connection with a fuel burner control system for a hot water heater.

As is illustrated in FIG. 1, the present invention is embodied in a control device including a casing, indicated generally at 1, having an inlet port 2 for receiving fuel from a gas source and communicating with a common internal passage 3 from which a pair of branch passages are controlled. One branch passage defines a pilot flow passage 4 leading to a pilot flow outlet port 5 which communicates with a conduit 6 for supplying fuel to a pilot burner 7; the other branch passage defines a main flow passage 8 that is controlled by a manually operable on-off valve 9 and a thermostatically operated valve 10, which valves are upstream of a main flow outlet port 11 that communicates with a conduit 12 for supplying fuel to a main burner 13.

The pilot flow passage 4 communicates with the common passage 3 intermediate its opposite ends which define upstream and downstream valve seats. The downstream valve seat 14 is controlled by combined reset and valve means which includes a valve member 15 carried adjacent one end of a reset stem 16. The upper end of the stem 16 extends through a sealing collar 17 on a plunger housing 18, in which a coil spring 19 encircles the stem 16 and is mounted in compression between the collar 17 and a disc 20 on the end of stem 16. The stem 16 is retained in the housing 18 by means of a hollow push button 21 which receives the stem disc 20 and which includes an annular bottom flange 22 engaging the housing wall which surrounds an opening therefor.

The upstream valve seat 23 is controlled by an electromagnetic device, indicated generally at 24, having a safety shut-off valve member 25 movably disposed for co-operation with the valve seat 23. The valve member 25 is fixed to one end of an armature stem 26 which has its other end fixed to an armature 27 located in a fixed magnet housing 28 so that the stem 26 is slidably disposed relative to the housing 28. A coil spring 29 surrounds one end of the armature stem 26 and is mounted in compression between the top end wall of the magnet housing 28 and the rear surface of the valve member 25 which is thus biased to a closed position against the valve seat 23. The valve member 25, stem 26 and armature 27 reciprocate as a unit between released and attracted positions relative to fixed electromagnetic means in the form of a generally U-shaped magnet core 30 and an electric coil 31 wound thereon. One end of electric coil 31 is connected to a ground terminal 32 and the other end is connected to an electrical conductor 33.

As is shown in FIG. 1, the bottom end wall of the magnet housing 28 is defined by support means in the form of a magnet base 34 having external threads so that the entire assembly 24 may be threaded into a suitable opening in the casing 1. In order to prevent any fuel leakage from such opening, the threads are provided with a sealing compound and a tapered sealing lip 35 on the periphery of the magnet base 34 which has a seal tight relationship with the periphery of such opening.

The conductor 33 extends through the top portion of the base 34 and has a concave surface disposed in the upper part of a cavity formed in the bottom portion of the base 34. A hexagonal periphery 37 on the exterior of the base bottom portion receives a wrench or tool for tightening the assembly 24 in the threaded opening of the casing 1. Between the hexagonal periphery 37 and the sealing lip 35, the exterior of the base 34 has a peripheral groove 36.

The magnet core 30 and conductor 33 are electrically insulated from each other and from the magnet base 34 by any suitable means (not shown) and all three are secured together as an integral unit. In order to connect the conductor 33 to controlling circuit means, the bottom portion of base 34 is slotted transversely to the axis of the cavity 38. As is shown in FIG. 2, the slot is perpendicular to one of the flats on hexagonal periphery 37 and axially extends from the lowermost end of base 34 to the upper part of cavity 38 where conductor 33 is positioned. An arcuate conductor head 39 of a thermocouple lead 40 is disposed in the cavity 38 while the thermocouple lead 40 extends to a thermocouple 41 which is positioned in the flame of the pilot burner 7 and which has its other lead connected to a ground terminal 42. A switch 43, of any suitable type such as a thermally responsive bimetal switch, has a pair of normally closed contacts 44 and 45 which are connected to terminal assembly leads 46 and 47, respectively.

A feature of the present invention includes an electrical terminal assembly 48 which may be inserted between the thermocouple lead conductor 39 and the seat of the magnet frame conductor 33. The electrical terminal assembly 48 includes a body of insulating material 49 having a base element 50 with spaced contacts therein. The first contact 52 has a connector portion 54 joined to the switch lead 46; a strip of insulating material 56 from the insulating body 49 separates the first contact surface 52 from a second contact surface 58 which has a connector portion 60 connected to the switch lead 47. The entire terminal assembly 48 is inserted in the transverse slot of the magnet base 34 to define a junction box between the conductor 33 and the thermocouple lead conductor 39. Thus the thermocouple circuit defines an energizing circuit for the magnet coil 31 while the switch circuit defines a controlling circuit therefor.

As is illustrated in FIG. 2, the control device 1 includes a mounting shank with exterior threads for fastening to gas burning appliance, such as the tank of a hot water heater. A thermostatic unit 10a for the automatic valve 10 is in the conventional form of a rod and tube carried by the mounting shank; the tube is made of thermally expandable material, such as copper, and the rod is made of relatively non-expandable material, such as Invar. The free end of the rod has a reduced portion which engages an operating lever for thermostatically cycling the automatically operated valve 10. A set screw secures one end of a spring arm 43a to the mounting shank; the reduced end portion of the rod extends through a suitable aperture in the spring arm 43a which is normally biased against the shoulder defining the reduced end portion. The free end of spring arm 43a extends through an opening in the mounting shank to operate the switch 43.

To place the system of FIG. 1 in operation, the manual valve 9 is rotated to an on position and temperature setting means (not shown) for the thermostatically operated valve 10 is moved to a selected temperature, e.g., 140° F. for conventional domestic hot water heaters. The reset button 21 is manually depressed whereby the valve member 15 is closed on vlave seat 14 to prevent any fuel flow through the main flow passage 8 during lighting and whereby the lower end of the reset stem 16 moves the valve member 25, stem 26 and armature 27 as a unit against the bias of coil spring 29 to an attracted or valve open position permitting a fuel flow through the pilot flow passage 4 to the pilot burner 7 where it is ignited as by a match. As soon as the thermocouple 41 is heated sufficiently by the pilot burner flame to energize the holding electromagnetic means, core 30 and coil 31, the push button 21 may be released whereupon the armature 27 is held in its attracted position and both valve seats 14 and 23 are open. Inasmuch as the thermostatically operated valve 10 is open, fuel flows to the main burner 13 which is ignited by the flame of the pilot burner 7.

When the water temperature reaches the selected temperature, the valve 10 is closed and the main fuel flow is cut off and the main burner 13 is extinguished. A subsequent decrease in the water temperature, as when the hot water is drawn off and replenished with cold water, causes the valve 10 to be opened again. During normal operation the main burner 7 will be cycled thermostatically as outlined above to maintain the water temperature at 140° F.

Should the flame at the pilot burner 7 be extinguished from any cause, the thermocouple 41 will cool and the thermoelectric current to the coil 31 will cease; thereupon, the armature 27 will be released from the magnet core 30 under the bias of the coil spring 29, which closes the safety valve member 25 on the valve seat 23 to effect 100% shut off of all fuel flow. In order to place the system in operation again, the resetting procedure outlined above must be repeated.

In this particular burner control system, the thermostatic switch 43 functions as a thermal limit control to prevent excessively high water temperature that could cause explosion of the hot water tank. In the event the water temperature increases to a dangerously high temperature, e.g., in the range above 190° F. due to some malfunction which keeps the main burner in operation, the thermostatic switch 43 will open. When the thermostatic switch 43 is closed, the thermoelectric energizing circuit may be traced as follows: from the ground terminal 42 through the thermocouple 41, the thermocouple cable lead 40, the arcuate seat 39, the terminal assembly contact surface 58, the connector 60, the lead 47, the closed switch contacts 45 and 44, the lead 46, the connector 54, the contact surface 52, the conductor 33 and the magnet coil 31 to the ground terminal 32. Thus, the abnormal temperature switch 43 is serially connected in the energizing circuit to define a controlling circuit for the magnet coil 31. When the thermostatic switch 43 is open, the magnet coil 31 is deenergized causing 100% shut off of all fuel flow as described above. As soon as the water temperature decreases to its normal operating range, the switch 43 will close, however, to commence operation of the system, the resetting procedure must be repeated as outlined above.

In the following description of the various modifications of the terminal assembly illustrated in FIGS. 3-12, only the structure associated with the modification will be described; the same reference numerals are being utilized for the same parts described above in connection with FIGS. 1 and 2 and reference numerals with 100 added are being utilized for similar parts in each modification and new reference numerals are being utilized for new parts in each modification. For example, the 100 series reference numerals relate to FIGS. 3-5, the 200 series to FIGS. 6 and 7, the 300 series to FIGS. 8 and 9, and the 400 series to FIGS. 10-12.

In FIGS. 3-5, the modified terminal assembly 148 includes a hollow cylindrical body 149 made of insulating material such as rubber or the like, and having a base element 150. A first base contact 152 has a generally hollow configuration with a closed end protruding out of the insulating cylinder 149 to contact the conductor 33. The opposite end of the contact 152 is flared and provided with a projecting arm 154 that is clamped or otherwise connected to the switch lead 46. As is illustrated in FIG. 5, an insulating strip 156 is positioned between the first contact 152 and a second contact 158 which has a generally hollow configuration with a flared end that engages the conductor 39 of the thermocouple lead 40. The flared end of the second contact 158 has a protruding arm 160 that is clamped or otherwise connected to the switch lead 47. From FIG. 5 it is apparent that the two contact connecting portions 154 and 160 are diametrically opposed to each other so as to preclude any electrical contact therebetween. The two contacts 152 and 158 and the insulator strip 156 therebetween are telescoped within the insulator body 149; the insulator base 150 is integral with the insulator body 149 and has a generally cup-shaped configuration covering the connecting portions 154 and 160. The entire assembly may be made as an integral unit as by bonding.

The non-threaded connector probe 148 is inserted into the cavity 38 of the magnet base 34 and is retained therein by means of a snap-on holder indicated generally at 162. The holder 162 has a generally cylindrical configuration 164, the upper portion of which has an arcuate cutout 166 defining an opening of approximately 160° As is shown in FIG. 4, the top of the holder cylinder 164 is provided with three equally spaced inwardly bent tabs 168 which are snapped in the annular groove 36 on the magnet base 34. The bottom wall of the holder 162 includes an everted annulus which is threaded at 170 to receive the threads of the thermocouple connector for the thermocouple lead 40.

The assembly is completed by threading the thermocouple connector into the threaded annulus 170 of the holder 162 whereby the thermocouple lead conductor 39 is pushed into engagement with the second contact 158 and the first contact 152 is pushed into engagement with the magnet conductor 33. The arrangement of FIGS. 3-5 has the particular advantage in that no special type of magnet base is necessary, i.e., such magnet bases need not be cross-slotted to receive the terminal 148; in addition, the switch lead positioning is independent of the magnet base position, and the holder 162 is self retaining to keep the terminal 148 in position until the thermocouple connection is made.

In the modification illustrated in FIGS. 6 and 7, the terminal assembly 248 includes a hollow cylindrical insulating body 249 and an insulating base element 250. A first contact 252 is a cylindrical solid with one end protruding out of the insulation sleeve 249 to engage the electromagnet conductor 33. The opposite end of the contact 252 has a connecting portion 254 which is electrically connected to the switch lead 46. An insulating strip 256 is disposed between the first contact 252 and a second contact 258 which has a connecting portion 260 for connection to the switch lead 47. Once the assembly is complete the insulating elements 249, 250 and 256 are secured together as by bonding to form an integral terminal assembly.

As is shown in FIG. 5, the electric terminal assembly defines a non-threaded connector probe which is inserted in the cavity 38 of the magnet base 34 and is retained therein by means of a holder indicated generally at 262. The holder 262 has a generally rectangular shape 265 with an opened end 266 and with its top edge having a perpendicularly bent flange 269 which is inserted in the annular groove 36 on the magnet base 34. The bottom wall of the rectangular holder 265 has an integrally formed boss 270 which is internally threaded to receive the threads of the thermocouple connector for the thermocouple lead 40. Adjacent its opened end the opposite walls of the rectangular holder 265 have a pair of aligned apertures 271 (FIG. 7) which receive a cotter pin to prevent accidental removal of the holder until the thermocouple connection is made.

In the modification illustrated in FIGS. 8 and 9, the terminal assembly 348 includes an insulating body having an outer base element 350 and an intermediately disposed retaining tab 351 depending from one wall thereof. The first contact 352 is a generally flat strip having a connecting portion 354 electrically joined to the switch lead 46. An insulating strip 356 is disposed between the first contact 352 and a second contact 358 which also is in the form of a flat strip having a connecting portion 360 electrically joined to the switch lead 47. The entire assembly is made as an integral unit as by bonding of all the insulating elements.

As is shown in FIG. 9, the magnet base 34 is provided with four equally spaced, transverse access openings, 372, 374, 376 and 378 which intersect the magnet base cavity 38. The bottom wall defining the outer edges of the four access openings is provided with a peripheral groove 380 which receives the retaining tab 351 as is illustrated in FIG. 8. A snap ring 367 is then inserted in the groove 380 and engages the retaining tab 351 to hold the entire assembly in its operative position.

As the magnet assembly 24 is threaded in the control body 1 and its position upon final seating is not positive, one or two of the four access openings may be inaccessible for insertion of the terminal assembly 348; however, at least two access openings are available for insertion of the terminal 348 allowing the choice of the most favorably positioned.

In the modification illustrated in FIGS. 10–12, the terminal assembly 448 includes an insulating body having an outer base element and a pair of spaced, strip-like contacts 452 and 458 separated by an insulating strip 456. The contacts 452 and 458 have connecting portions electrically joined to switch leads 46 and 47, respectively. Surrounding the exposed portions of the contacts 452 and 458, the insulating body defines a ring like insulating annulus 451 (FIG. 11), the diameter of which is greater than the width of the terminal assembly 448.

As is shown in FIG. 10, the magnet base 34 is provided with a pair of diametrically opposed keyhole type slots which intersect the base cavity 38. Each keyhole slot is defined by an upper portion 482 (486) and a smaller lower portion 484 (488), the total dimension of which is slightly larger than the diameter of the insulating ring 451. This arrangement has the particular advantage in that no special type of holder is needed to prevent separation of the terminal assembly 448 from the magnet base 34. In the assembly of this arrangement, the terminal 448 is inserted edgewise in a selected one of the keyhole slots 482–484 and the feature of connector retention is obtained by rotation of terminal assembly 448 after such insertion and before the thermocouple connector is threaded in place. Since the diameter of the ring 451 is larger than the width of slot portions 482 or 484, the terminal assembly 448 is retained in place.

Inasmuch as the present invention is subject to many other modifications, variations and changes in detail, it is intended that all matter contained in the foregoing description or shown on the accompanying drawings shall be interpreted as illustrative and not in a limiting sense.

What is claimed is:
1. An electromagnetic assembly comprising
a housing,
electromagnetic means in said housing,
a supporting base for said housing and having a portion defining a cavity,
conductor means connected to said electromagnetic means and extending through said base into said cavity for connection to energizing circuit means,
an electric terminal assembly including an insulation body having a cylindrical sleeve extending into said cavity and a base element disposed below said cavity, said terminal assembly having a pair of spaced contacts adapted for respective connection to said conductor means and said energizing circuit means,
one of said contacts being exposed at one end of said sleeve and the other being exposed at an opposite end of said base element,
a pair of switch leads electrically connected to said spaced contacts to define controlling circuit means, and
retainer means including a hollow holder substantially surrounding said base element and having connector means aligned with said base cavity to receive a connection from the energizing circuit means, groove means on the exterior of said supporting base, and means on said holder being disposed in said groove means for retaining said terminal assembly on said supporting base.

2. The invention as recited in claim 1 wherein said means on said holder comprises a plurality of spaced tabs defining a snap-on connection with said groove means.

3. The invention as recited in claim 1 wherein said means on said holder comprises a peripheral flange defining a slide-on connection with said groove means.

4. The invention as recited in claim 1 wherein said one contact comprises a cylindrical element having its exposed end protruding out of said sleeve and an insulating strip separates said other contact from said cylindrical element.

5. The invention as recited in claim 4 wherein said cylindrical element, said insulating strip and said other contact are vested together within said insulating body to define an integral terminal assembly.

6. An electromagnetic assembly comprising
a housing,
electromagnetic means in said housing,
a supporting base for said housing and having a portion defining a cavity and a plurality of circumferentially spaced slots intersecting the cavity therein,
conductor means connected to said electromagnetic means and extending through said base into said cavity for connection to energizing circuit means,
an electric terminal assembly being inserted in a selected one of said slots and having a pair of spaced contacts comprising superimposed conductor strips with an insulation strip therebetween and being adapted for respective connection to said conductor means and the energizing circuit means,
said terminal assembly including an insulation body surrounding said conductor strips and having an open portion whereby each said conductor strip has exposed parts for connection to said conductor means and the energizing circuit means, respectively,
a pair of switch leads electrically connected to said spaced contacts to define controlling circuit means, and
retainer means cooperating with said base and said terminal assembly for retaining said terminal assembly on said base.

7. The invention as recited in claim 6 wherein said retainer means includes tab means on an outer wall of the insulation body of said terminal assembly and ring means clamping said tab means to said supporting base.

8. The invention as recited in claim 6 wherein each of said plurality of slots has a keyhole configuration and wherein said retainer means comprises a ring element on said insulation body to hold the same in a selected one of said slots.

9. The invention as recited in claim 8 wherein said ring element encircles the exposed parts of said conductor strips.

References Cited
UNITED STATES PATENTS 2,767,355  10/1956  Wolff _____ 317—123

JOHN F. COUCH, Primary Examiner
D. J. HARNISH, Assistant Examiner

U.S. Cl. X.R.
339—89, 92, 276; 236—21; 126—351